(12) United States Patent
Ehret

(10) Patent No.: US 8,854,255 B1
(45) Date of Patent: Oct. 7, 2014

(54) GROUND MOVING TARGET INDICATING RADAR

(75) Inventor: Timothy Ehret, Medford, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 659 days.

(21) Appl. No.: 13/072,905

(22) Filed: Mar. 28, 2011

(51) Int. Cl.
   G01S 15/50 (2006.01)
   G01S 13/52 (2006.01)

(52) U.S. Cl.
   USPC .......................................... 342/160; 342/161

(58) Field of Classification Search
   USPC ................. 342/25, 160, 161, 195; 367/87, 93
   See application file for complete search history.

(56) References Cited

U.S. PATENT DOCUMENTS

| | | | |
|---|---|---|---|
| 4,601,106 A | 7/1986 | Leinonen | |
| 4,641,107 A | 2/1987 | Kalokitis | |
| 4,780,685 A | 10/1988 | Ferguson | |
| 4,885,590 A | 12/1989 | Hasan | |
| 4,965,530 A | 10/1990 | Katz | |
| 5,017,927 A | 5/1991 | Agrawal et al. | |
| 5,103,233 A | 4/1992 | Gallagher et al. | |
| 5,151,702 A | 9/1992 | Urkowitz | |
| 5,157,403 A | 10/1992 | Urkowitz | |
| 5,309,161 A | 5/1994 | Urkowitz et al. | |
| 5,343,208 A | 8/1994 | Chesley | |
| 5,376,939 A | 12/1994 | Urkowitz | |
| 5,414,428 A | 5/1995 | Gallagher et al. | |
| 5,440,311 A | 8/1995 | Gallagher et al. | |
| 5,481,270 A | 1/1996 | Urkowitz et al. | |
| 6,084,540 A | 7/2000 | Yu | |
| 6,184,820 B1 | 2/2001 | Kratzer | |
| 6,469,671 B1 | 10/2002 | Pluymers et al. | |
| 6,483,478 B2 | 11/2002 | Yu | |
| 6,639,546 B1 | 10/2003 | Ott et al. | |
| 6,861,974 B1 | 3/2005 | Poe et al. | |
| 6,995,638 B1 | 2/2006 | Smith et al. | |
| 7,076,201 B2 | 7/2006 | Ammar | |
| 7,081,848 B1 | 7/2006 | Adams | |
| 7,345,629 B2 | 3/2008 | Dulmovits, Jr. et al. | |
| 7,355,547 B2 | 4/2008 | Nakazawa et al. | |
| 7,492,313 B1 | 2/2009 | Ehret et al. | |
| 2002/0030250 A1 | 3/2002 | Ammar | |

*Primary Examiner* — Dao Phan
(74) *Attorney, Agent, or Firm* — Howard IP Law Group, PC

(57) ABSTRACT

An airborne moving target indicating (MTI) radar includes an array antenna. A receive processor electronically multiplies the signals received by each antenna element by element enable/disable signals which vary from time to time, thus electronically moving the effective phase center of the antenna array. The motion of the phase center is matched to the moving vehicle speed and direction.

21 Claims, 13 Drawing Sheets

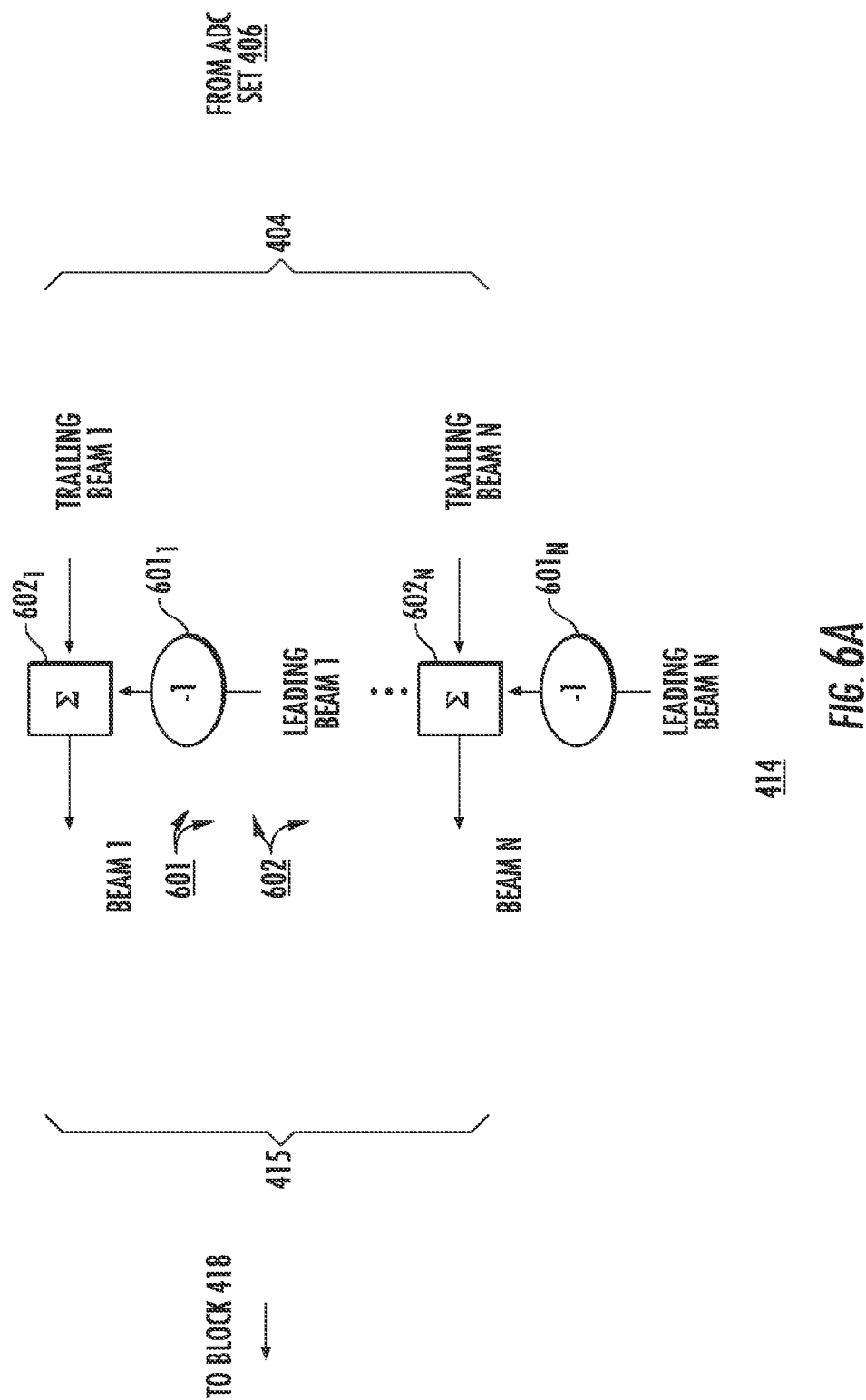

GROUND MOVING TARGET INDICATING RADAR

BACKGROUND

Identification and tracking of surface moving targets is coming to a forefront of importance. Such tracking allows identification of vehicles that stop at locations suitable for the planting of Improvised Explosive Devices (IEDs), and ideally would also show the dismounted individual and his location. Tracking of surface moving targets can be performed by radar systems. Radar systems are widely known. Early radar systems used vacuum tubes in analog circuits, and were subject to reliability problems. In particular, the vacuum tubes would age with time, and the operating parameters of the radar system would vary on an almost continuous basis, requiring constant realignment. When left in operation, the many vacuum tubes of a radar system would give rise to frequent failures attributable to normal aging and often excessive heat. If turned off when not in use, the thermal cycling would often result in tube failures at each turn-on, requiring trouble-shooting and maintenance.

With the advent of solid-state devices, some of the low-frequency, low-power functions of a radar system could be converted away from tubes. This often provided a major improvement in reliability. The introduction of integrated circuits gave impetus for their use in the low-frequency, low-power sections of a radar system, and also gave impetus to the then-nascent field of digital signal processing.

Digital signal processing gained dominance in the field of radar signal processing. Advanced or special-purpose integrated circuits were developed to handle high frequencies. Solid-state devices have been limited, however, in their ability to handle the large amounts of power required for radar transmissions. This problem has been partially solved by dividing the power to be transmitted among a plurality of solid-state amplifiers, each of which provides transmit power to one or a few antenna elements of an active array antenna. Examples of such solid-state amplifiers appear in U.S. Pat. Nos. 4,601,106 and 4,641,107, issued Feb. 3, 1987 to Kalokitis; U.S. Pat. No. 4,780,685 issued Oct. 25, 1988 to Ferguson; and U.S. Pat. No. 4,965,530 issued Oct. 23, 1990 to Katz. Solid-state amplifiers are often found embedded within transmit-receive (T/R) modules. Such TR modules are described, for example, in U.S. Pat. No. 5,017,927, issued May 21, 1991 to Agrawal et al. The use of many such these T/R modules in a limited space gives rise to heat removal or temperature problems, and an art, exemplified by U.S. Pat. No. 6,469,671, issued Oct. 22, 2002 to Pluymers et al., has arisen to configure such systems for convenient heat removal.

The design of radar systems involves a complex tradeoff among many factors, among which are system complexity, cost, weight, performance, and reliability. Some of the problems, issues and considerations challenging the design of radars in various contexts are described or addressed in many publications, as for example in U.S. Pat. No. 4,885,590 issued Dec. 5, 1989 to Hasan; U.S. Pat. No. 5,103,233 issued Apr. 7, 1992 to Gallagher et al.; U.S. Pat. No. 5,151,702, issued Sep. 29, 1992 to Urkowitz; U.S. Pat. No. 5,157,403 issued Oct. 20, 1992 to Urkowitz; U.S. Pat. No. 5,309,161 issued May 3, 1994 to Urkowitz et al.; U.S. Pat. No. 5,343,208 issued Aug. 30, 1994 in the name of Chesley; U.S. Pat. No. 5,376,939 issued Dec. 27, 1994 to Urkowitz; U.S. Pat. No. 5,414,428 issued May 9, 1995 to Gallagher et al.; U.S. Pat. No. 5,440,311 issued Aug. 8, 1995 to Gallagher et al.; U.S. Pat. No. 5,481,270 issued Jan. 2, 1996 to Urkowitz et al.; U.S. Pat. No. 6,084,540 issued Jul. 4, 2000 to Yu; U.S. Pat. No. 6,184,820 issued Feb. 6, 2001 to Kratzer; U.S. Pat. No. 6,483,478 issued Nov. 19, 2002 to Yu; U.S. Pat. No. 6,639,546 issued Oct. 28, 2003 to Ott et al.; U.S. Pat. No. 7,081,848 issued Jul. 25, 2006 to Adams; and U.S. Pat. No. 6,861,974 issued Mar. 1, 2005 to Poe et al. The problems associated with radar system design are more numerous and complex than might be thought. As an example of problems which are not signal processing problems, U.S. Pat. No. 6,995,638, issued Feb. 7, 2006 in the name of Smith et al. describes a structural augmentation arrangement which is intended to aid in maintaining reliability attributable to physical flexure or movement between a transmitter and an associated antenna. Among other problems associated with radar system design are that the beamformers (if any), circulators (if any), T/R modules, and filters (if any) associated with each elemental antenna of the antenna array tend to be physically large. It is very desirable to be able to set the inter-antenna-element spacing of an antenna array based on operational factors such as operating frequency, beam width, sidelobe level, grating lobes, and the like. The large size of the T/R modules tends to make selection of an appropriate inter-antenna-element spacing difficult. This problem has been addressed by selecting an appropriate inter-antenna-element spacing, and in a related fashion, by feeding groups of antenna elements in common.

Many advanced radar systems rely on a plurality of antenna array elements with associated T/R modules. Each T/R module includes circuitry that provides an analog modulation of an RF signal's phase and amplitude characteristics. After these modulations are performed, an RF beamformer sums the module's individual signals to form a beam with directional gain. These analog modulation devices and analog beamformers are expensive, require considerable space, and may require cooling. If multiple simultaneous beams are required, a plurality of these circuits is needed within the same space, compounding the shortcomings of the architecture. Additionally, to control these analog circuits, multi-bit digital control signals must be sent to each circuit at a specified rate. This requires a computational source to generate the signals and a network to distribute them in a timely manner.

In some areas of conflict such as in the deserts of Iraq, flat terrain is well adapted to the use of airborne synthetic aperture radar (SAR) systems, so that a synthetic aperture radar system can scan a broad region and illuminate most targets in that region. Moving target indication (MTI) or Doppler processing can identify those targets which are moving, and can also determine the rate of motion, so as to be able to distinguish between a vehicle moving at, for example, 20 meters per second (m/sec) and a dismounted human, who might move at ½ m/sec.

In other areas of conflict, as in Afghanistan, the use of ground moving target indicating radar is made difficult by the mountainous terrain, which shadows much of the target region of interest.

Another problem associated with ground moving target indicating radar lies in the need for maximizing the area of coverage as much as possible, so that fewer ground moving target indicating radar systems are required overall. Maximizing the area of coverage tends to increase the time between successive "looks" at the target, which the result that, while spatial coverage may cover the desired area, temporal coverage suffers, or vice versa. That is to say, that a time of twenty or thirty seconds between successive "looks" at a particular target may allow stops of a vehicle or dismount to go unnoticed. Additional problems are that conventional GMTI systems use a "side looking" radar configuration where the search region is observed, at a distance, from a single side of the radar aircraft, at a low beam grazing angle.

The aircraft performs this search while flying along one leg of a "race-track" flight pattern. In order to stay on station, the aircraft must turn 180° and fly along a second parallel leg of the race-track pattern. This continues throughout the radar mission. However, while the aircraft performs its 180° turns, it must cease to perform its radar mission, resulting in missed detection opportunities.

Improved or alternative ground or surface moving target indicating radar arrangements are desired.

SUMMARY

A method according to an aspect of the disclosure is for determining the presence and velocity of a moving surface target. The method comprises the steps of mounting a planar array antenna on an airborne vehicle with a broad surface of the array perpendicular to the vertical. The method includes, at first and second times, transmitting electromagnetic pulses of a transmit radar beam from the array antenna toward the targets, to thereby generate reflections from the targets. At times lying between the first and second times, and following the first and second times, reflections are received from the targets at the array antenna to thereby generate first and second received signals, respectively. The method includes the electronic processing of the first received signals to define a plurality of simultaneous first receive beams which together cover the region of the targets, and which beams originate from a first phase center of the array, and electronically processing the second received signals to define a like plurality of simultaneous second receive beams which together cover the region of the targets, and which second receive beams originate from a second phase center of the array different from the first phase center, where the first and second phase centers are spaced apart such that, during the time interval between the first and second pulses, the effective movement of the first and second phase centers equals the movement of the vehicle relative to the surface below. In a particularly advantageous mode of the method, the first and second received signals are mutually subtracted to thereby cancel returns from stationary targets.

A method according to another aspect of the disclosure is for determining at least one of the presence and velocity of a moving surface target. The method comprises the step of mounting a planar array antenna on an airborne vehicle with a broad surface of the array perpendicular to the vertical. At first and second times, pulses are transmitted of a transmit radar beam from the array toward a region containing the targets to thereby generate reflections from the targets. The reflections from the targets are received at the array antenna to thereby generate first and second received signals, respectively. The first received signals are processed to define a plurality of simultaneous first receive beams which together cover the region, which first receive beams originate from a first phase center of the array, and the second received signals are processed to define a like plurality of simultaneous second receive beams which together cover the region, where the second receive beams originate from a second phase center of the array different from the first phase center, and where the first and second phase centers are spaced apart and electronically switched such that, during the time interval between the first and second pulses, the effective movement of the phase center is equal and opposite to the movement of the vehicle.

A method according to a yet further aspect of the disclosure for determining the presence and velocity of a moving surface target comprises the step of mounting a planar array antenna on an airborne vehicle with a broad surface of the array perpendicular to the vertical. At first and second times, pulses of a transmit radar beam are transmitted from the array toward the targets to thereby generate reflections from the targets. At times following the first and second times, first and second reflections from the targets are received at the array antenna to thereby generate first and second received signals, respectively. The first received signals are processed to define a plurality of simultaneous receive beams which together cover the region of the targets and which originate from a first phase center of the array, and processing the second received signals to define a plurality of simultaneous receive beams which together cover the region of the targets and which originate from a second phase center of the array, where the spacing of the first and second phase centers is selected such that, during the time interval between the first and second times, the effective movement of the phase center is equal and opposite to the movement of the vehicle, electronically enabling and disabling the processing of received signals from selected ones of the elements of the antenna array to thereby enable the first and second phase centers. The method includes the step of subtracting the first and second return signals to thereby cancel returns from stationary targets.

An airborne radar system according to an aspect of the disclosure comprises an airborne array antenna, and a transmitter arrangement coupled to the array antenna for generating transmit signals for driving the array antenna for transmitting electromagnetic pulses in a transmit beam downward from the array antenna. The radar system also includes first and second receiver arrangements coupled to the array antenna, each of the receiver arrangements being for beamforming received reflected signals to define receive beams, which receive beams together cover the region illuminated by the transmit beam, and for responding to antenna-element enabling and disabling signals for enabling some antenna elements and for disabling others. A moving-target enhancer (or equivalently stationary-target canceller) includes first and second beam ports or beam port sets, the first beam ports being coupled to the first receiver arrangement, for enhancing moving target signals, which exhibit relative phase shift, applied to the first and second beam ports. A delay element is coupled to the second receiver arrangement and to the second beam ports of the moving-target enhancer, for delaying, by at least one electromagnetic pulse recurrence interval, the signals flowing from the second receiver arrangement to the second beam ports of the moving target enhancer. A phase center controller is coupled to the moving-target enhancer for producing a pattern of the element enabling and disabling signals for identifying those elements of the array antenna which are to be effectively enabled and disabled, to thereby establish effective electronic motion of the phase center of the array antenna on reception. In a particular embodiment, a target detector is coupled to the moving-target enhancer for identifying and enhancing targets. In another embodiment, each of the first and second receiver arrangements comprises a source of complex beam coefficients which define the parameters of the receive beams, beamformer multipliers coupled to the source of complex beam coefficients and to the phase center controller, for multiplying the complex beam coefficients by the element enabling and disabling signals to thereby produce antenna element control products or product signals. Complex multipliers are coupled to the beamformer multipliers for receiving the antenna element control products, and are also coupled to the array antenna, for multiplying the received reflected signals by the antenna element control products. The transmitter arrangement may further comprise a beam spoiler for applying a random function to each antenna element for generating the broad beam.

A receive arrangement according to an aspect of the disclosure comprises an array antenna including a plurality of antenna elements at which received signals are received. A source provides beam-defining complex beam coefficients. Another source provides beamformer multiplier signals; the state of each of the beamformer multiplier signals represents the processing or lack of processing (the processing gain) of the received signals of a corresponding one of the antenna elements, and these beamformer multiplier signals change state from time to time. Beam/phase-center multipliers are coupled to the source of beamformer multiplier signals and to the source of beam-defining complex beam coefficients, for generating beam and phase center control signals. Received signal multipliers are coupled to the array antenna and to the beam/phase-center multipliers, for multiplying the received signals by the beam and phase center control signals to thereby produce processed received signals. A beamformer arrangement includes input ports coupled to the received signal multipliers, and also includes beam-specific output ports, for generating target signals at the output ports. In a particular embodiment, the receive arrangement further comprises a transmitter for transmitting electromagnetic pulses defining a pulse recurrence interval, a delay element for delaying signals by one pulse recurrence interval, and a moving target enhancer (or equivalently a stationary target canceller) including input ports coupled directly to the beamformer arrangement and other input ports coupled to the beamformer arrangement by way of the delay element, for canceling non-moving targets.

An airborne moving target indicating radar, according to an aspect of the disclosure includes an array antenna mounted on an airborne platform. The array antenna includes antenna elements which receive radar return signals. A source provides array element enable/disable signals which vary from time to time. A receive signal processor is coupled to the elements of the array antenna, for multiplying the radar return signals by the array element enable/disable signals and by complex beam coefficients defining the receive beams, for thereby generating beam target signals. A beamforming arrangement is coupled to the receive signal processor for processing the beam target signals, and for generating separate beam signals, each including target signals relating to the particular beam, the beam signals being related to phase centers defined by the enable/disable signals, which as mentioned move from time to time.

BRIEF DESCRIPTION OF THE DRAWINGS

FIG. 6A is a simplified representation of the processing in a beamformer portion of the receive processing of FIG. 4A.

DETAILED DESCRIPTION

Figure 1A:
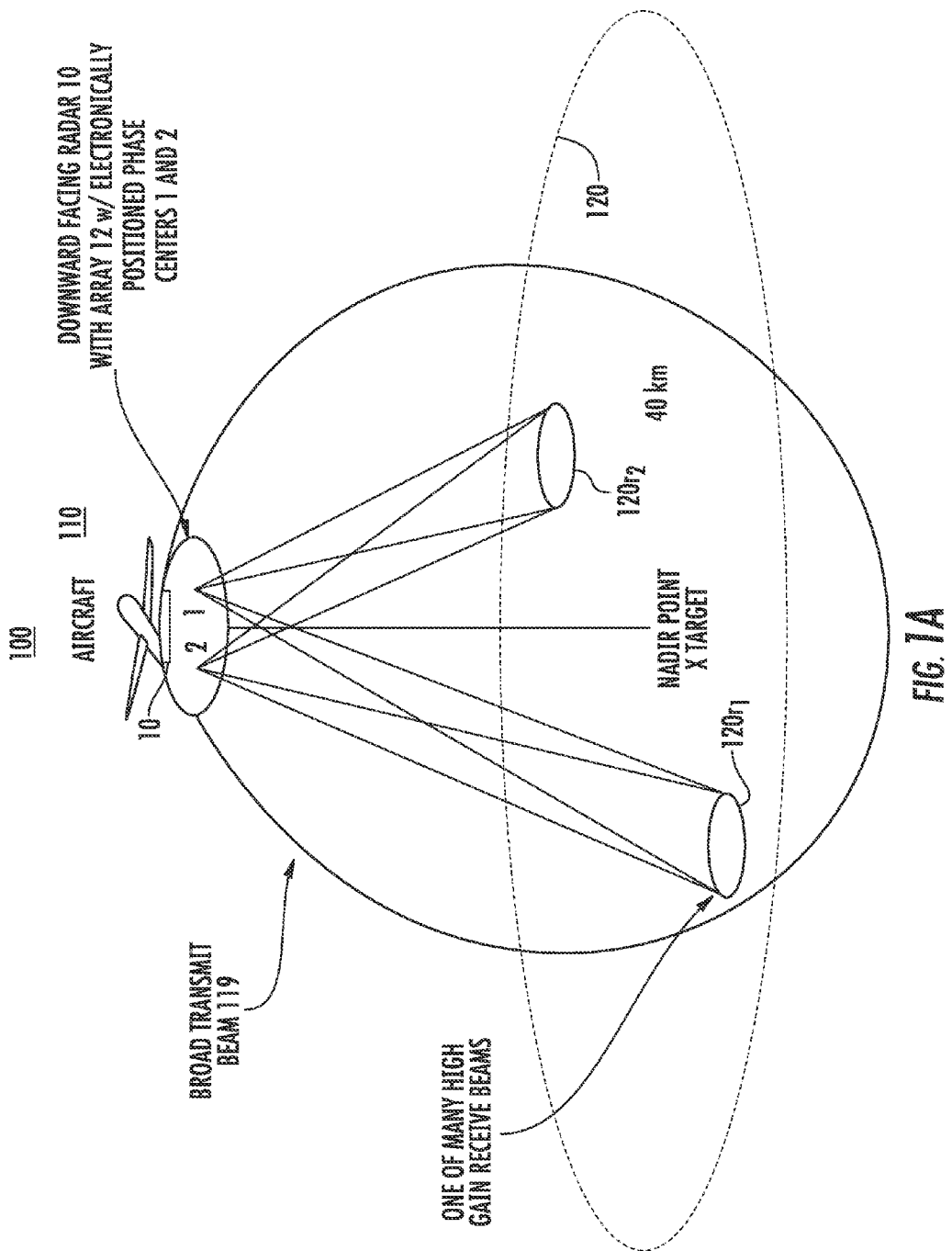
FIG. 1A is a simplified representation of an airborne vehicle carrying a radar system including a generally planar antenna array.

The description herein includes relative placement or orientation words such as "top," "bottom," "up," "down," "lower," "upper," "horizontal," "vertical," "above," "below," as well as derivative terms such as "horizontally," "downwardly," and the like. These and other terms should be understood as to refer to the orientation or position then being described, or illustrated in the drawing(s), and not to the orientation or position of the actual element(s) being described or illustrated. These terms are used for convenience in description and understanding, and do not require that the apparatus be constructed or operated in the described position or orientation.

Terms concerning attachments, couplings, and the like, such as "connected," "attached," "mounted," refer in a mechanical context to relationships in which structures are secured or attached to one another either directly or indirectly through intervening structures, as well as both movable and rigid attachments or relationships, unless expressly described otherwise. In an electrical context, such terms have a meaning which includes both direct electrical connection and connection through intermediate elements.

In the past, the term "radio frequencies" was interpreted to mean a limited range of frequencies, such as, for example, the range extending from about 20 KHz to 2 MHz. Those skilled in the art know that "radio" frequencies as now understood extends over the entire frequency spectrum, including those frequencies in the "microwave" and "millimeter-wave" regions, and up to light-wave frequencies. Many of these frequencies are very important for commercial purposes, as they include the frequencies at which radar systems, global positioning systems, satellite cellular communications and ordinary terrestrial cellphone systems operate.

Those skilled in the arts of antenna arrays and beamformers know that antennas are transducers which transduce electromagnetic energy between unguided- and guided-wave forms. More particularly, the unguided form of electromagnetic energy is that propagating in "free space," while guided electromagnetic energy follows a defined path established by a "transmission line" of some sort. Transmission lines include coaxial cables, rectangular and circular conductive waveguides, dielectric paths, and the like. Antennas are totally reciprocal devices, which have the same beam characteristics in both transmission and reception modes. For historic reasons, the guided-wave port of an antenna is termed a "feed" port, regardless of whether the antenna operates in transmission or reception. The beam characteristics of an antenna are established, in part, by the size of the radiating portions of the antenna relative to the wavelength. Small antennas make for relatively broad or nondirective beams, and large antennas make for small, narrow or directive beams. When more directivity (narrower beamwidth) is desired than can be achieved from a single antenna, several antennas may be grouped together into an "array" and fed together in a phase-controlled manner, to generate the beam characteristics of an antenna larger than that of any single antenna element. Discrete structures which control the apportionment of power to (or from) the antenna elements are termed "beamformers," and a beamformer includes a beam port and a plurality of element ports. Modern antenna systems use electronic beamforming, so that a discrete device is not needed. In a transmit mode, the signal to be transmitted by the antenna array is applied to the beam port and is distributed by the beamformer (whether discrete or distributed electronic) to the various element ports. In the receive mode, the unguided electromagnetic signals received by the antenna elements and coupled in guided form to the element ports are combined to produce a beam signal at the beam port of the beamformer. A salient advantage of sophisticated beamformers is that they may include a plurality of beam ports, each of which distributes the electromagnetic energy in such a fashion that different beams may be generated simultaneously.

Guided electromagnetic energy follows a defined path established by a "transmission line" of some sort. A salient difference between a "transmission line" and an ordinary electrical conductor arrangement is that the transmission line has constant surge or characteristic impedance along its length, or if the impedance varies along its length the variation is controlled rather than uncontrolled. Transmission lines include coaxial cables, rectangular and circular conductive waveguides, dielectric paths, and the like. Each of these structures has the property of transverse dimensions and cross-sectional topology which remain constant (or change in a controlled manner) as a function of length. Thus, the diameter of the center conductor and bore of the outer conductor of a coaxial transmission line remain constant along the pertinent length. Topological transformations of the cross-section of a transmission line can result in a different type of transmission line, as for example a topological transformation of a coaxial transmission line can result in a microstrip transmission line configuration.

FIG. 1A illustrates a scenario 100 in which an airborne vehicle 110 carries a nominally downward-facing radar 10 with an antenna array 12. The radar 10 is arranged to electronically position the phase center of the array between at least first and second positions, designated 1 and 2, respectively, on the array, so as to tend to cancel the phase effects of the forward motion of the airborne vehicle 110. Radar 10 is arranged to produce a relatively broad transmit beam, illustrated as 119, which produces a wide area of coverage, which may, for example, extend 40 kilometers from the nadir point, as represented by circle 120. Radar 10 is also arranged to electronically subdivide the array antenna 12 into plural subarrays, so as to simultaneously generate a plurality of high-gain (narrow relative to the broad transmit beam) beams in the receive mode of operation. The high gain produces a narrow beam which subtends a relatively small footprint on the Earth's surface, such as represented by footprints 120r1 and 120r2 of FIG. 1A. Together, the receive beams 120r1, 120r2 and other like beams cover the region 120 illuminated by the transmit beam 119. At least one of these footprints can be expected to overlie the location $X_{target}$ of a moving surface target.

Figure 5A:
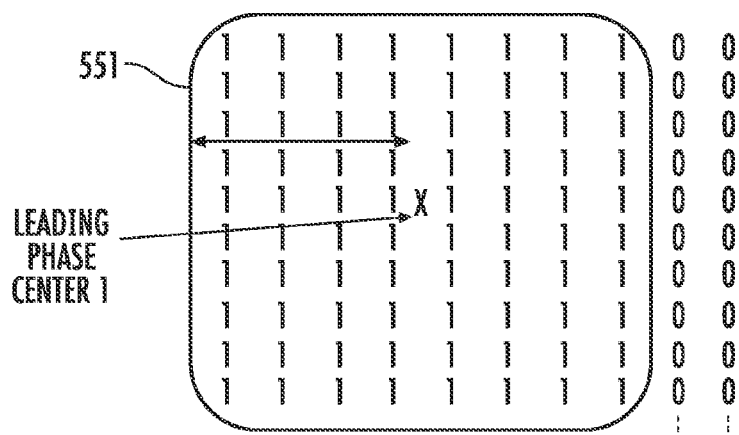
FIGS. 5A and 5B are notional illustrations of an antenna array with some of the elements rendered nonfunctional in a receive mode of operation in order to effect a change in the location of the phase center.
Figure 5B:
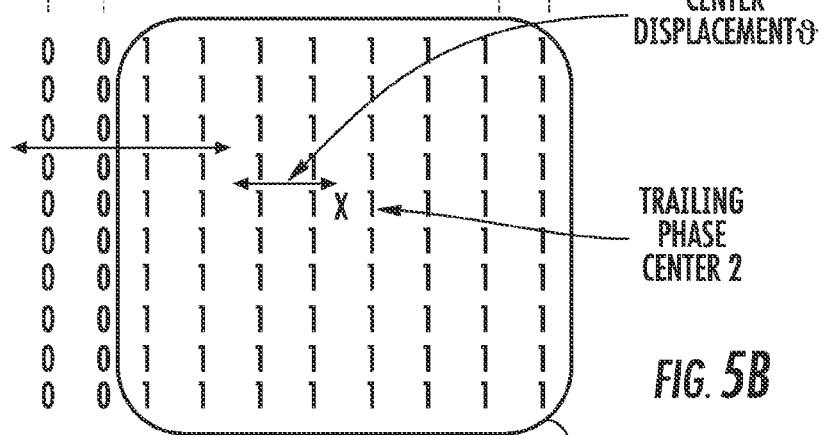

In the context of a planar array antenna, the phase center may be viewed as being located at the geometric centroid of the array, as described in detail in conjunction with FIGS. 5A and 5B.

Figure 1B:
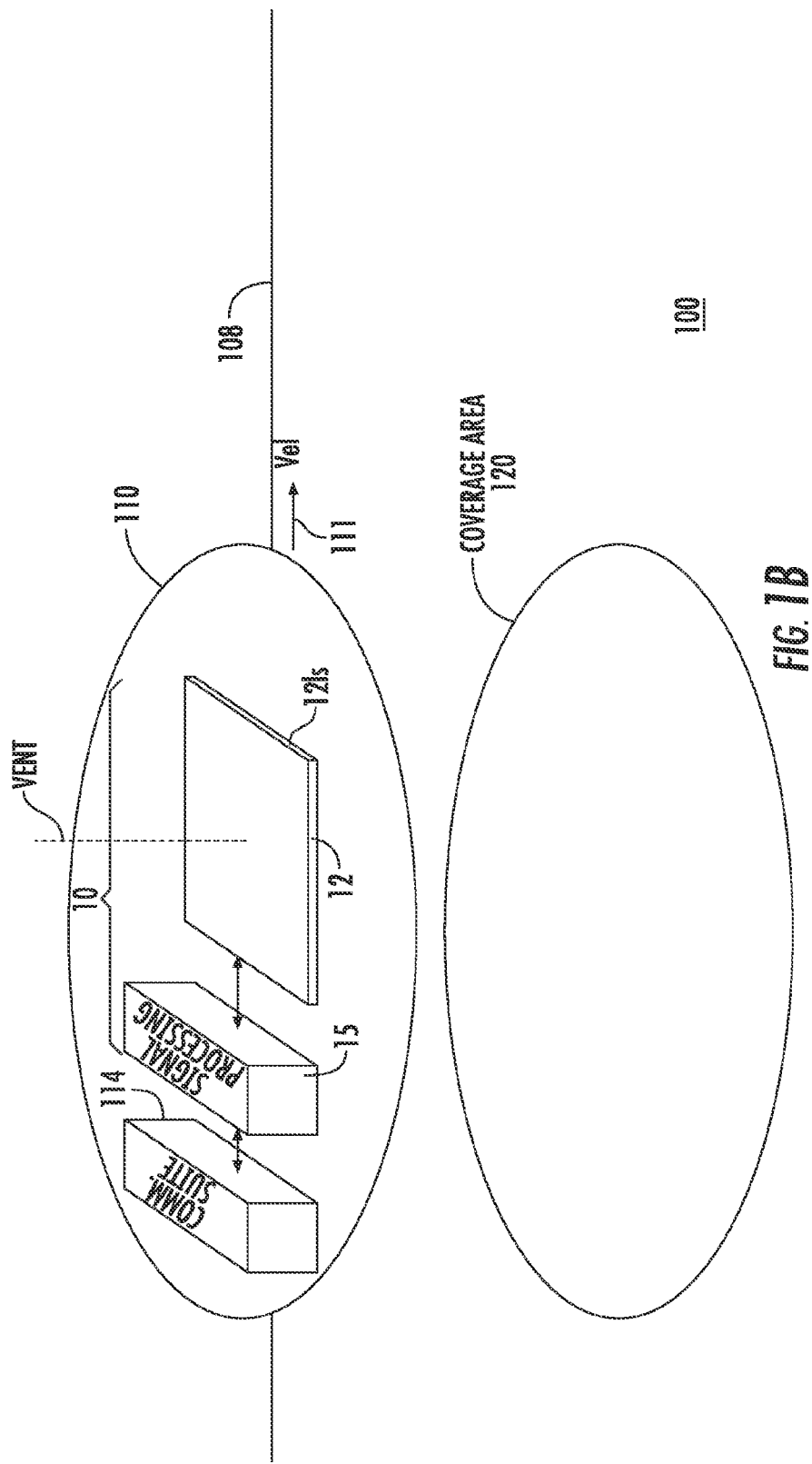
FIG. 1B is a more detailed representation of the arrangement of FIG. 1A, in which the vehicle carries a communication suite and the radar system is coupled to a signal processor and to the antenna array for generating beam patterns providing coverage of a region.

FIG. 1B illustrates some details of the arrangement of FIG. 1A. In FIG. 1B, vehicle 110 flies at a velocity VEL in the direction of arrow 111 over a portion of the Earth's surface, with the horizon 108 in the distance. The airborne vehicle 110 carries inter alia a radar system 10 according to aspects of the disclosure. Radar 10 includes a generally planar array antenna 12 oriented with its lower surface 12ls defining a broad active side (the side with the antenna elements) nominally parallel with the local Earth's surface. Put another way, the orientation of the broad active surface of antenna 12 is nominally orthogonal to the local vertical direction Vert. The word "nominal" is used, as it is well known that airborne vehicles are subject to intentional and unintentional attitude deviations, and there may be times when the active surface of the antenna array 12 is not so orthogonal. In FIG. 1B, array antenna 12 is coupled to a signal processing arrangement illustrated as a block 15. The combination of the array antenna and signal processing defines a generally or nominally downlooking radar which may have a coverage area or region such as that designated 120. The existence of targets within the coverage region 120, and the range of those targets, is reported by radar 10 to a communication suite illustrated as a block 114. Communications suite 114 reports targets and target information to, and receives commands from, a remote command post, not illustrated.

Figure 1C:
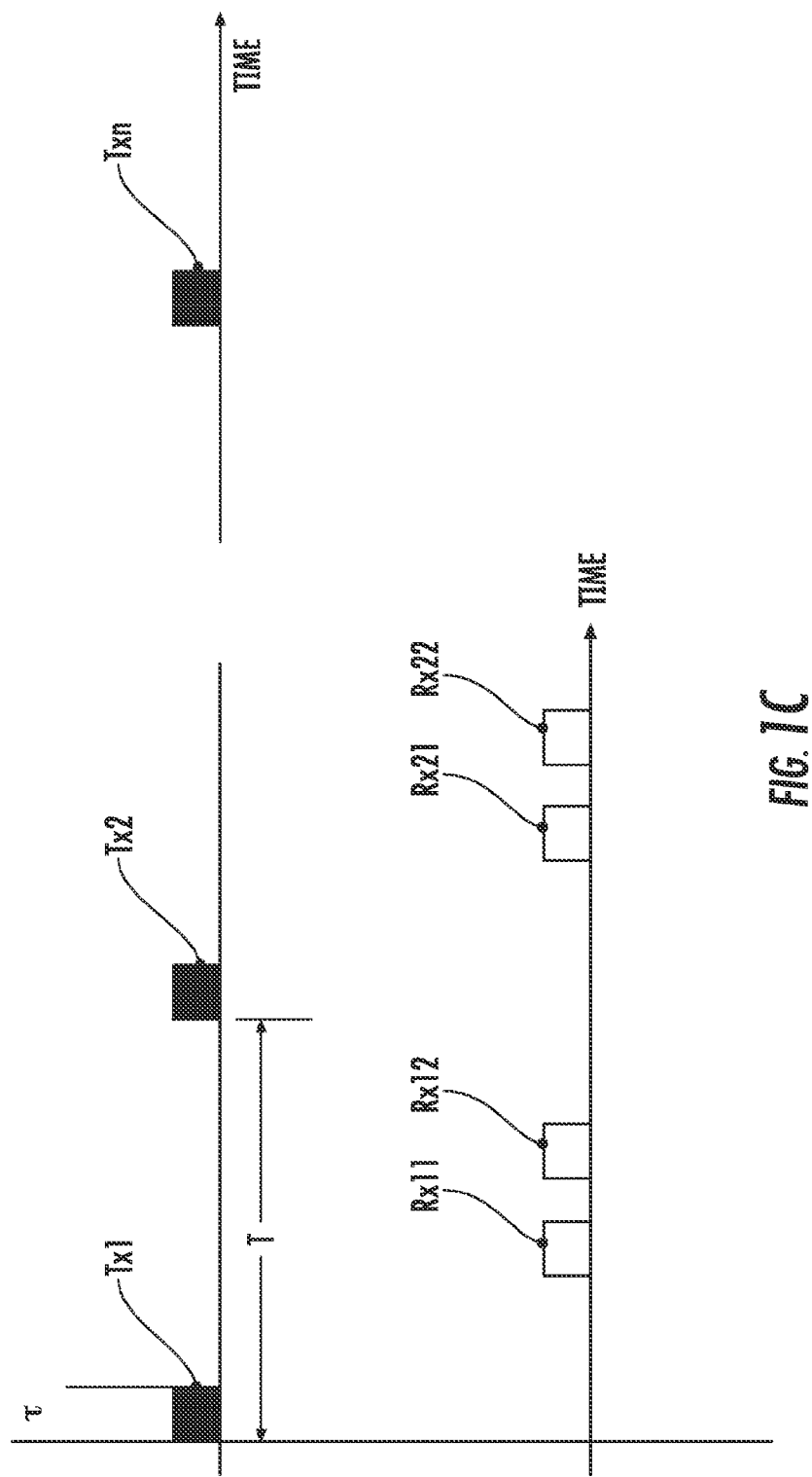
FIG. 1C is a timing diagram illustrating the timing of various transmissions and of representative receptions.

FIG. 1C illustrates a time line with transmit (Tx) and receive (Rx) pulse intervals. More particularly, the transmit intervals are illustrated as being separated by a time T. In order to distinguish them, the transmit pulses are designated with numbers, thus TX1, Tx2, Tx3, . . . . The receive timeline of FIG. 1C shows relatively closely spaced receive intervals designated Rx11 and Rx12 lying within the interval between transmissions Tx1 and Tx2. Similarly, FIG. 1C shows relatively closely spaced receive intervals designated Rx21 and Rx22 lying within the interval between transmissions Tx2 and Tx3. Intervals Rx11, Rx12, Rx21, and Rx22 represent intervals during which reception is performed.

Figure 2A:
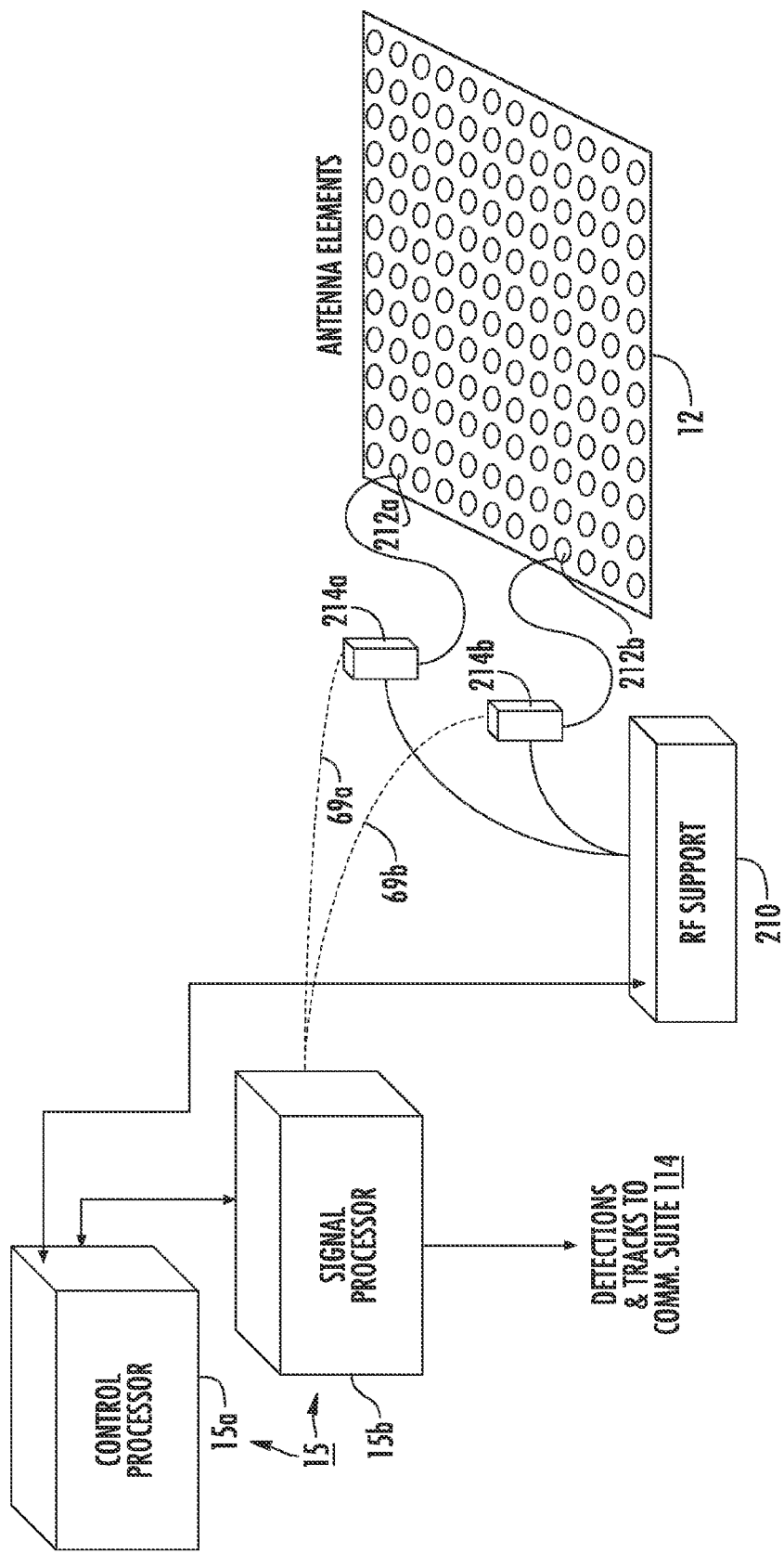
FIG. 2A is a generalized representation of a radar system.

FIG. 2A is a simplified block diagram of an "all-digital" radar system. The "all-digital" term relates to the relationship of analog signals to digital signals in the system. Since the electromagnetic signals which are transmitted and received by a radar system exist in an analog environment, analog signals must be transmitted and received, which requires analog processing coupled of the antenna(s). Other than such analog processing adjacent the antennas, however, the remainder of the functions of the radar system, including beamforming, are performed by digital signal processing. An example of a digital processing radar systems is described in U.S. Pat. No. 7,492,313, issued Feb. 17, 2009 in the name of Ehret et al.

In FIG. 2A, the signal processor 15 of FIG. 1B can be seen to include a control processor (also known as a radar control computer or RCC) 15a and a signal processor 15b. Control processor 15a establishes the operating parameters of the radar system, including the operating frequency, the repetition rate and pulse width or duration, pulse compression coding and receive sampling rate. The commands representing analog functions are routed to a block 210 designated as "RF support." Block 210 responds to the commands from processor 15a to produce all the analog signals appropriate to the radar operating mode, including using upconversion and downconversion oscillators to generate the upconversion and downconversion functions on transmit and receive, respectively. These analog signals are provided to T/R modules coupled to the various antenna elements of array 12. Representative T/R modules designated 214a and 214b are coupled to corresponding representative antenna elements 212a and 212b, respectively, of antenna array 212.

Figure 2B:
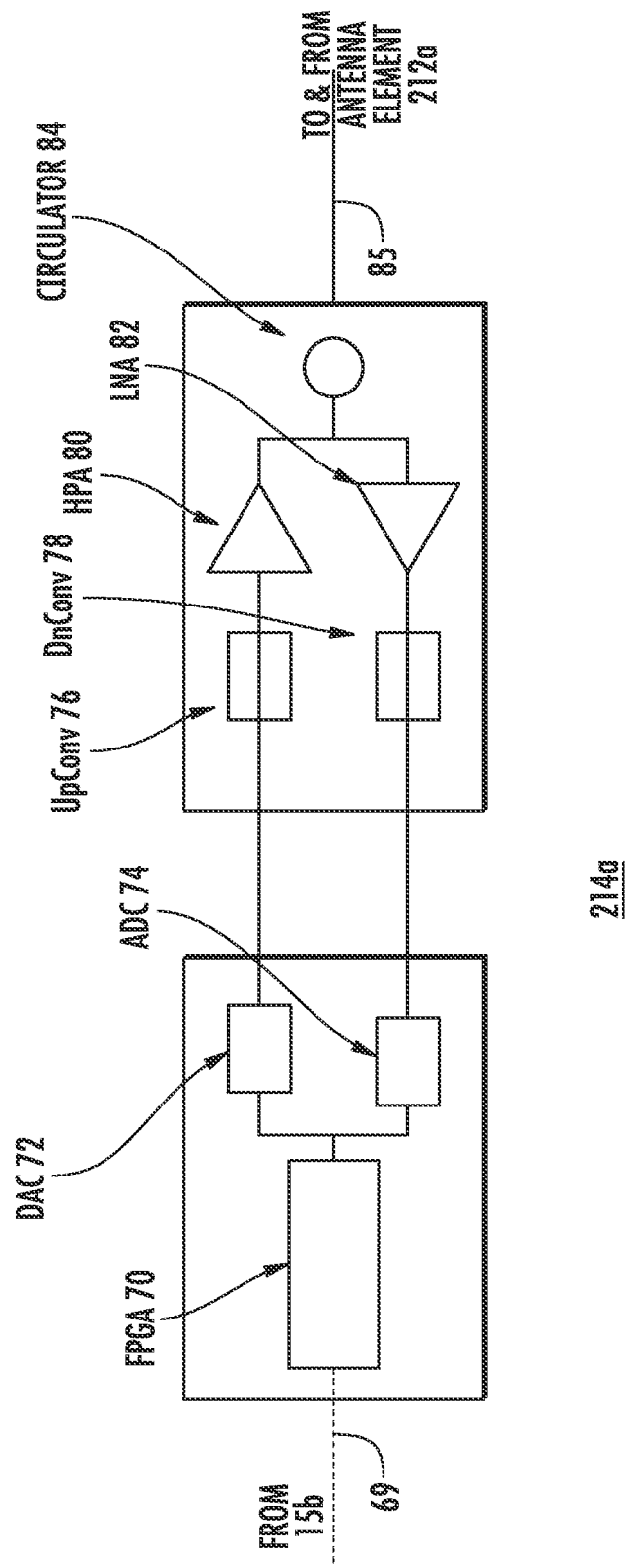
FIG. 2B illustrates details of a portion of the arrangements of FIG. 2A.

FIG. 2B is a simplified block diagram illustrating some details of representative T/R module 214a of FIG. 2A. In FIG. 2B, digital data signals flow on a path 69 between processor 15b and a further processor 70, illustrated as being a field-programmable gate array (FPGA). This antenna-element-specific or element-level digital data conveys antenna-element-specific phase and amplitude information, including any beam steering, beamshape modulation, or beam sidelobe control. The element-level digital data are applied from FPGA 70 to a digital-to-analog converter (DAC) 72, which produces analog-compatible signals at the output of DAC 72. The analog-compatible signals are applied to an upconverter designated 76, which upconverts the analog signals to the desired operating electromagnetic frequency, and the upconverted signal is applied from upconverter 76 to a high power amplifier (HPA) 80. The amplified signal is applied from HPA 80 by way of a circulator 84 and a path 85 to the associated antenna element, in this case element 212a. In a receive operating mode, electromagnetic return signals which are received by an antenna element, such as element 212a, are coupled to a low-noise amplifier (LNA) 82 by way of path 85 and circulator 84. These return signals represent data about the target(s) and its (their) parameters. The amplified analog receive signals are applied from LNA 82 to a downconverter 78, for conversion to intermediate frequency (IF) or to baseband. The IF or baseband signals are applied from downconverter 78 to an analog-to-digital converter (DAC) 74, which converts the analog signals to corresponding digital signals, which retain most of the target-related information content or data. The target data is processed in FPGA 70 and provided to processor 15b (FIG. 2A) for extraction of information about the target.

Figure 3:
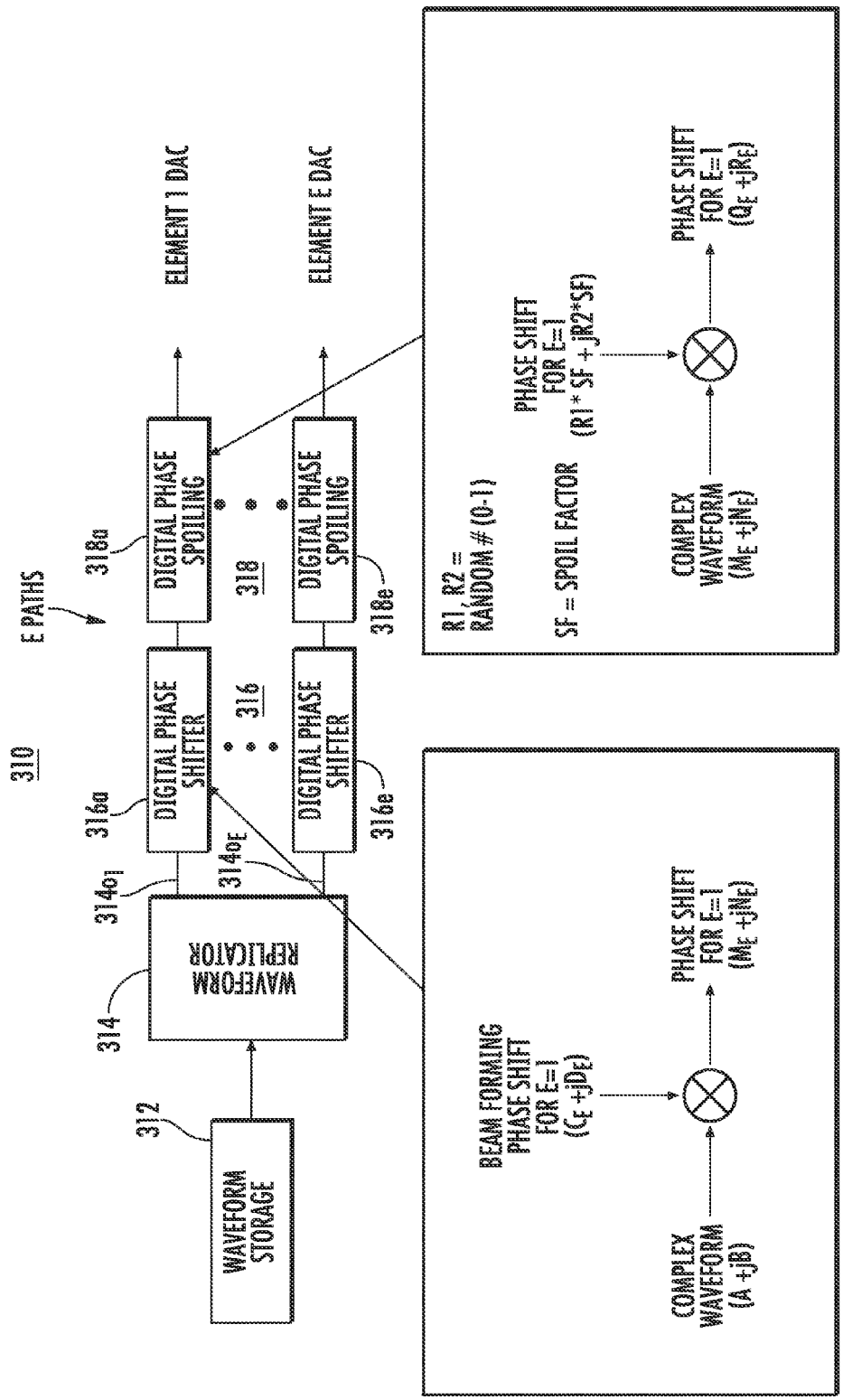
FIG. 3 is a simplified logic flow chart or functional block diagram illustrating various processes performed according to aspects of the disclosure to transmit a spoiled beam from the antenna array during transmission operation.

FIG. 3 is a simplified diagram illustrating the control or operation 310 within digital processor 15b of FIG. 2A for a transmit mode of operation. In FIG. 3, process 310 includes storage 312 of a plurality of different preselected complex transmit waveforms, among which may be waveform(s) consisting on N pulses with a pulse repetition interval=T sec, pulse duration=tau (i) sec, and with pulse coding specified as Linear FM, non-Linear FM, or Pseudo-Random Noise types. As mentioned, the transmit waveform is selected to be a broad or "spoiled" beam providing illumination of the entirety of the target region defined by boundary 120 of FIG. 1B. The selected one of the transmit waveforms is applied from storage 312 to a waveform replicator 314, which re-generates the selected waveform at the desired pulse repetition rate (or a single pulse for some purposes) on a plurality of E output paths $314o_1 \ldots, 314o_E$, one for each antenna element to be used for transmission. More particularly, the transmit waveforms are applied to a plurality E of paths, each of which includes a digital phase shifter $316_a, \ldots, 316_e$ of a set 316 of phase shifters. Thus, the first path includes a beam direction phase shifter 316a, ..., and the last path includes a beam direction phase shifter 316e. In each of the E paths, beamforming phase shifting is accomplished by a digital phase shifter of set 316. The beam direction phase shifting for the $E^{th}$ element can be represented as multiplication (x) of the complex transmit waveform (A+jB) by the beamforming phase shift $(C_E+jD_E)$ to produce the antenna-element-E-specific product $(M_E+jN_E)$.

The beam direction phase shifts of the transmit waveform(s) provided by phase shifters of set 316 of phase shifters, if applied, without more, to the elements of a large antenna array such as array 12, will result in a transmit beam pointed in the proper direction, but which beam may be too narrow or high-gain to provide the desired "flood" beam coverage, as required for simultaneous illumination or coverage of the region 120 of interest. The beam-direction-phase-shifted digital signals from set 316 of phase shifters of FIG. 3 flow to a set 318 of digital phase spoiling phase shifters, one for each antenna element of the antenna array 12. The spoilation is performed by the use of random numbers, designated R1 and R2, which range in value from 0 to 1, and which may take on values lying between 0 and 1. Digital phase spoiling phase shifters 318a, ..., 318e of set 318 of phase shifters each receive the beam-direction-phase-shifted phase commands from a phase shifter of set 316 of beam direction phase shifters. Thus, the input phase command to each beam spoiling phase shifter of set 318 is $(M_E+jN_E)$. As illustrated in FIG. 3, the multiplication (x) of the complex input phase is by (R1*SF+jR2*SF). The resulting beam-direction-controlled and beam-spoiled product is represented by $(Q_E+jR_E)$. This product is applied from the set 318 of phase shifters of FIG. 3 to the FPGA 70 of FIG. 2B to adjust the beam direction and spoliation phases of the transmitted signal from array 12. The result is transmission of a broad beam of electromagnetic pulses which illuminates the entirety of the coverage area circumscribed by boundary 120 of FIG. 1A. The broadening of the transmit beam reduces the overall radar gain, but the gain is recovered by a longer integrating time. Since the antenna array is nominally downward-looking, there should not be substantial shadowing of portions of the coverage area by hills or structures, as can occur with side-looking radars subject to grazing-angle problems. The illumination results in reflections from all targets in the coverage region, which return to the airborne radar system.

Figure 4A:
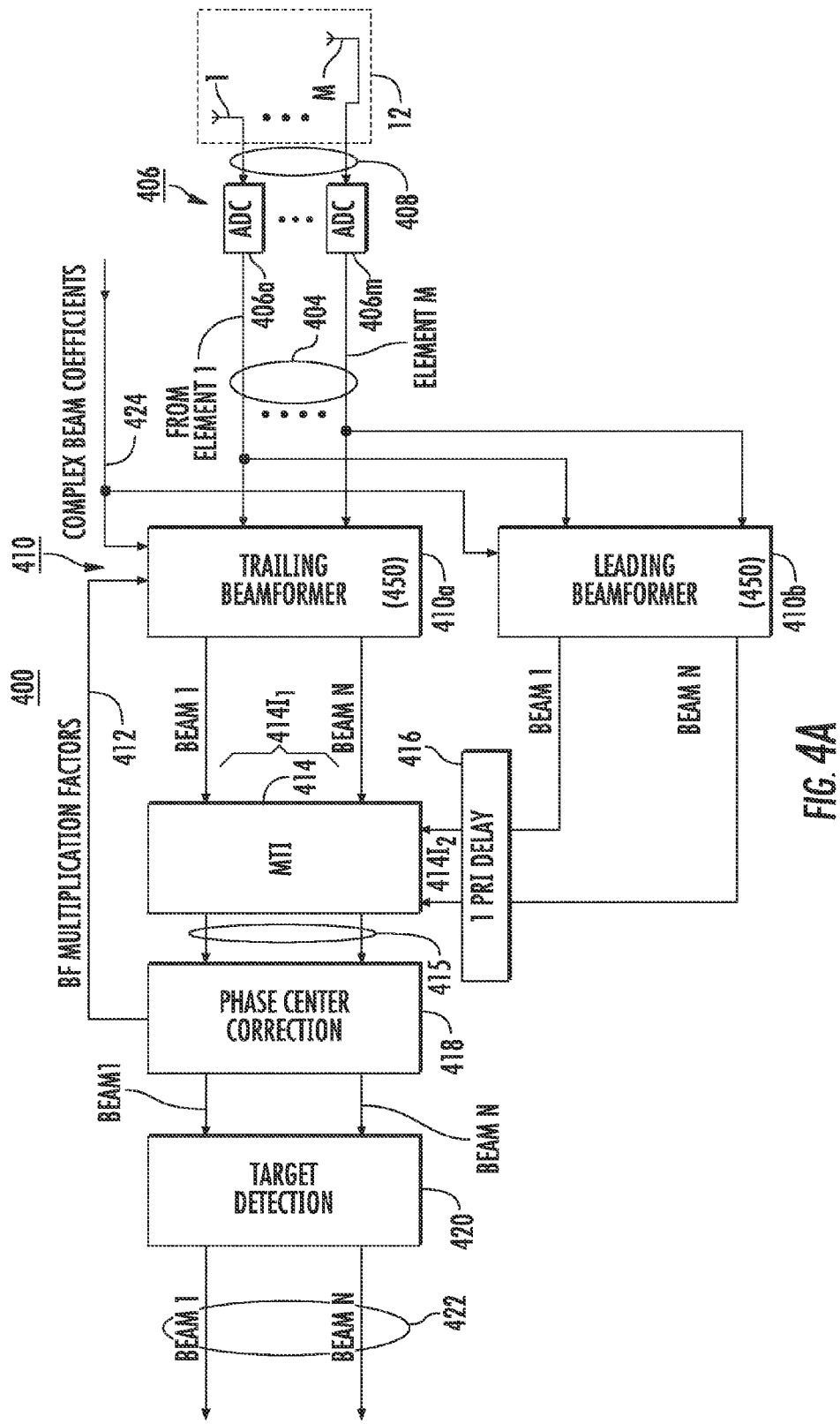
FIG. 4A is a simplified flow chart or functional block diagram illustrating the various processes performed according to aspects of the disclosure to generate receive beams and electronically change the phase center of the antenna array for moving target identification (MTI) or ground moving target identification (GMTI)

FIG. 4A is a simplified block diagram illustrating receive signal processing in processor 15 of FIG. 1B according to an aspect of the invention. The electromagnetic signals received by each of M antenna elements of array 12 are applied by way of a set of paths 408 to a set 406 of corresponding analog-to-digital converters (ADC) 406a, ..., 406M of processing 400 of FIG. 4A. ADCs 406a, ..., 406M each produce digital signals originating from one of the associated M antenna elements of array 12. The digital signals produced by each of the M ADCs of set 406, representing the electromagnetic signals received by each antenna element, are applied over a set 404 of signal paths to a set 410 of beamformers. The number of beamformers in the set 410 of FIG. 4A is two, designated "trailing" (or lagging) beamformer 410a and "leading" beamformer 410b. The digital signals originating from all of the antenna elements are applied to both beamformers 410a and 410b. Trailing beamformer 410a and leading beamformer 410b also receive complex beam coefficients, of the form (a+jb), by way of a path 424, for each antenna element and receive beam position. Since there are M antenna elements in array 12, and there may be as many as U beams, a total of U*M complex beam coefficients are applied to each of the beamformers 410a, 410b of set 410 of beamformers. These complex beam coefficients represent the phase shifts required for each antenna element of the array 12 to generate the desired set of relatively narrow receive beams, keeping in mind that each antenna element may contribute to a plurality of separate receive beams. The complex beam coefficients may be calculated by an offline processor (not illustrated) or prestored in memory. When the complex beam coefficients are applied to the signal data from the antenna elements they generate an array of receive beams designed to cover the entire surveillance region. The footprints 120r1 and 120r2 of two of these receive beams are shown in FIG. 1A.

The trailing and leading beamformers 410a and 410b, respectively, of FIG. 4A, in addition to receiving receive beam forming information in the form of complex beam coefficients, also receive by way of paths 412 beamforming multiplier or multiplication factors in the form of ones or zeros. These beamforming multiplication factors are factors in the beamformer summations, and are intended to establish the desired effective "motion" of the phase center of the array antenna 12. Thus, the BF Multipliers applied to beamformers 410b and 410a define the active elements in the leading and trailing beamformers, respectively. A BF Multiplication factor of "zero" (0) eliminates an antenna element from contributing to a beamformer, while a factor of one (1) includes the element in the beamformer processing. The trailing beamformer 410a and the leading beamformer 410b simultaneously generate the desired narrow or high-gain beams at their Beam 1 through Beam N output ports.

FIG. 5A is a simplified plan view of a representative antenna array including ten rows and ten columns of antenna elements, the locations of which are designated by either a numeral 1 (one) or a numeral 0 (zero). The numbers 1 and 0 represent the Beamformer Multiplier value for the antenna element in question. A Beamformer Multiplier value of 1 indicates that the antenna element is included in a beamformer, and a value of 0 indicates that the antenna element is not included in a beamformer. Thus, a Beamformer Multiplier value of 1 indicates an "active" antenna element, and a Beamformer Multiplier value of 0 indicates an "inactive" antenna element. As illustrated in FIG. 5A, a solid outline 551 surrounds those active antenna elements designated with the numeral "1," and does not include those elements designated with a "0." This defines an active antenna portion which includes the left-most eight columns of antenna elements and excludes the right-most two columns. The phase center of the active antenna elements portion of FIG. 5A is indicated by an X designated "leading phase center 1," which is at the geometric center of the active region, which active region is displaced to the left relative to the actual center of the array antenna taken as a whole. Similarly, FIG. 5B illustrates the same 10×10 antenna array, with a different distribution of Beamformer Multiplier values. As illustrated in FIG. 5B, the right-most eight columns of the antenna array are given a Beamformer Multiplier value of 1, and the left-most two columns are given Beamformer Multiplier values of 0. A solid line 502 defines the active region of the antenna array. The X representing phase center 2 of the antenna array of FIG. 5B is at the geometric center of the active region 552, but is to the right of the actual center of the array antenna taken as a whole. Comparing the locations of the phase centers 1 and 2 of the active antenna arrays 501 and 502 shows that the phase center moves from left to right as a function of the active region as defined by the sets of Beamformer Multiplier values. In this manner, the phase center of an array antenna is electronically moved. In the situation described in conjunction with FIGS. 5a and 5B, the phase center displacement is by two column widths. Repeated change of the set of Beamformer Multiplier values can result in repeated effective motions of the phase center of the array antenna.

Returning now to FIG. 4A, receiver processing 400 applies the receive beam output signals from trailing beamformer 410a to a ground moving target indication (GMTI or MTI) function illustrated as a block 414, and applies the beam output signals from leading beamformer 410b to MTI function 414 by way of a time delay function 416. The time delay imposed by delay function 416 is in the amount of one pulse repetition interval (PRI), well known in the radar art. Thus, MTI function 414 receives current narrow-footprint beam information and one-PRI-delayed narrow-footprint beam information, where the narrow beams cover the same footprint. MTI function 414 performs a subtraction of the two pulses, thereby tending to eliminate time invariant signals occurring within the pulses; this may be viewed as enhancing moving targets. In this way, return signals that are consistent with clutter returns are eliminated. FIG. 6A is a simplified diagram illustrating this subtraction process. Thus, any remaining signals processed by MTI block 414 appear on path set 415 of FIG. 4A, and in principle represent targets which are in motion. However, the motion of the airborne vehicle tends to impair the clutter reduction, and this motion is compensated for, at least in part, by electronic phase center movement of the array antenna. The data produced by MTI function 414 of FIG. 4A is applied to a phase center correction function illustrated as a block 418.

Figure 6B:
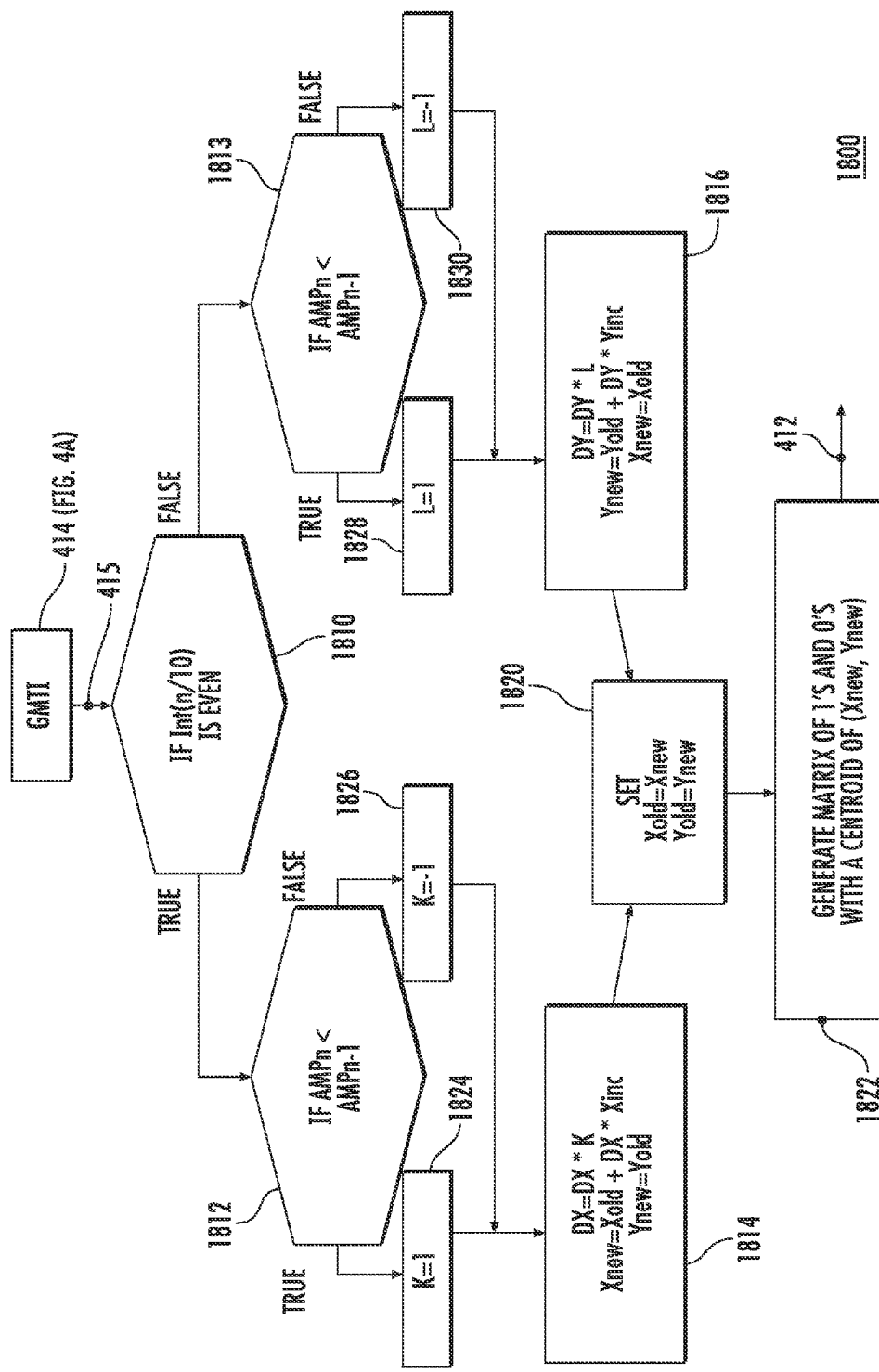
FIG. 6B is a logic flow chart illustrating details of the processing in the phase center correction function.

The MTI-processed received signals generated at the outputs of MTI block 414 of FIG. 4A are passed through a phase center processing block 418 to the target detection Block 420. Phase center processing block 418 contains a baseline set of multipliers which define the elements comprising the leading and trailing beamformers, as described in conjunction with FIGS. 5A and 5B. The phase center correction function 418 examines the MTI output amplitude of a single beam position, which has not been associated with target tracking (i.e. beams containing clutter only). Phase center correction function 418 compares this amplitude to the amplitude level for the same beam from the last PRI. FIG. 6B illustrates logic for perturbing the location of the phase center of the lagging array. The phase center of the leading array remains fixed throughout the process The perturbations of the location of the phase center of the lagging array alternate, from pulse to pulse, between the X and Y axes of the array to compensate for platform motion in 2 dimensions. These minor perturbations in phase center continue throughout system operation, with the algorithm finding and then toggling about the optimal set of multipliers. The beamformer multiplication signals are applied from Phase Center Correction block 418 by way of path 412 to the trailing or lagging beamformers 410a. The N outputs of phase center correction function or block 418, representing beam 1 through beam N signals that may contain targets, are applied to a target detector 420, which, for each receive antenna beam, applies the MTI output amplitude to a detection threshold. If a signal exceeds the threshold, a target detection is declared by block 420. The identified moving targets in each of the receive beam footprints are simultaneously made available on paths 422 for display or countermeasure control.

Figure 4B:
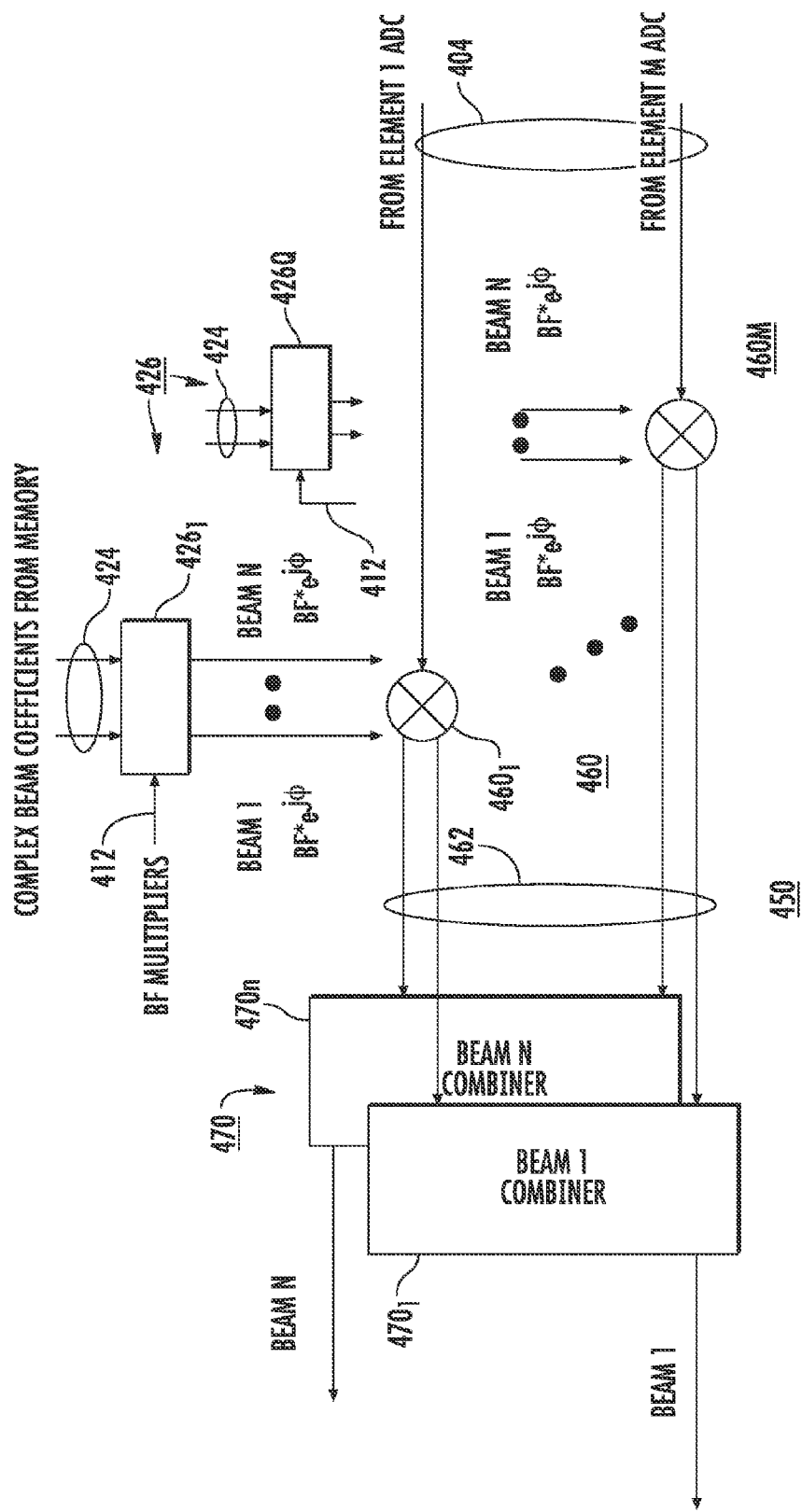
FIG. 4B is a more detailed logic flow chart or diagram (or functional block diagram) illustrating details of FIG. 4A.

FIG. 4B is a simplified functional block diagram illustrating details of the processing 450 associated with a beamformer (either lagging or leading) of set 410 of FIG. 4A. In FIG. 4B, a lagging or leading beamformer function is designated generally as 450. Function 450 of FIG. 4B includes a set 460 of complex multipliers $460_1, \ldots, 460_M$. The complex multipliers of set 460 receive digital data by way of M paths of set 404 of paths, which data represents the electromagnetic return energy received by the various elements of the antenna array 12 of FIG. 1B. Processing 450 also receives from a storage ROM or memory (not illustrated), by way of a path set 424, complex beam coefficients which represent the pointing of the various narrow or high-gain receive beams.

The complex beam coefficients from path 424 can be viewed as being in the form of either (e^j*theta) or (a+jb). The complex beam coefficients from path 424 are applied to the multipliers $426_1, \ldots, 426_O$ of a set 426 of multipliers, together with beamformer (BF) multiplier signals from path set 412. Each multiplier block of set 426 multiplies the corresponding element of the complex beam coefficients by the appropriate BF multiplier to generate products or factors $BF*e^{j\phi}$ that define the correct leading or trailing beamformer. Blocks 426 support complex coefficients for N beams. The products or factors $BF*e^{j\phi}$ are multiplied in set 460 of multipliers by the return signal data from path 404 to produce on a path set 462 phase weighted signals from each array element, for each receive beam position. The multiplied signals on path set 462 are applied to beam combiners $470_1, \ldots, 470_N$ of a set 470 of beam combiners, which combine the multiplied signals on paths 462 on a beam-by-beam basis. The combined signals represent full array gain receive beams, whose combined coverage area is equal to the total surveillance region (120 of FIG. 1A). The combined signals at the output ports of the beam combiners $470_1, \ldots, 470_N$ of set 470 of beam combiners represent the reflected or return radar signals in each receive beam for the appropriate (trailing or leading) beamformer of set 410 of beamformers of FIG. 4A.

As described in conjunction with FIGS. 5A and 5B, the phase center of antenna 12 is, or may be viewed as being simply the two-dimensional centroid of a group of contiguous array elements whose outputs are summed. Adding or subtracting elements at the periphery of the array shifts this phase center. According to an aspect of the disclosure, the output of the MTI canceller 414 of FIG. 4A is monitored by phase center correction block 418, and the phase center position(s) are modulated from pulse to pulse or from time to time to optimize MTI performance. FIG. 6A is a simplified notional diagram illustrating the processing performed within MTI block 414 of FIG. 4A. As shown in FIG. 6A, the processing 414 involves changing the sign of the leading beam 1 information in a sign changing block $601_1$ of a set 601 of sign changing blocks, and summation (Σ) of the trailing beam 1 information with the sign-changed leading beam 1 information in a block $602_1$ of a set 602 of summation blocks, to effectively subtract the leading beam 1 information from the trailing beam 1 information. As mentioned, this leaves only the moving targets in beam 1. Similarly, processing 414 involves changing the sign of the leading beam N information in a sign changing block $601_N$ of set 601, and summation (Σ) of the trailing beam N information with the sign-changed leading beam N information in summation block $602_N$, to effectively subtract the leading beam N information from the trailing beam N information. As mentioned, this leaves only the moving targets in beam N. The moving target information is applied over path set 415 to phase center correction block 418 of FIG. 4A.

FIG. 6B is a simplified logic or control diagram or chart illustrating the processing 1800 in phase center correction block 418 of FIG. 4A. In FIG. 6B, the pulses of index n flow from ground moving target indicator (GMTI) block 414 to a decision block 1810. In general, a dwell may include hundreds of pulses, and it may be desired to iterate the phase center in the X direction for ten pulses and then in the Y direction for ten pulses. For this purpose, decision block 1810 divides the pulse index number by 10. Decision block 1810 routes the logic or command by the TRUE output if the value of index n is even, and by the FALSE path if the value of n is odd. From the TRUE output of decision block 1810, logic 1800 flows to a further decision block 1812. The amplitudes of the pulses appearing at the output of the MTI block 414 for a beam which receives no target returns is a reference for determining the direction the phase center should be moved. If the amplitude of the "targetless" beam(s) is increasing, the stepped motion (in the X or Y direction, as applicable) is changed (that is, changed from +X to −X, for example. If the amplitude is decreasing, the phase stepping is maintained in the same direction. Eventually, the phase center will overshoot the optimum value and then iterate around the optimum value. Thus, decision block 1812 decides if the Amplitude of pulse n (AMPn) is less than the Amplitude of pulse n−1 (AMPn−1). If AmPn is less than AMPn−1, logic 1800 of FIG. 6B flows by the TRUE output of block 1812 to a block 1824. A factor K is set equal to +1 in block 1824. If AMPn is not less than AMPn−1, the logic 1800 leaves decision block 1812 by the FALSE output, and arrives at a block 1826. Block 1826 sets K equal to −1. The change of polarity of K results in changing the direction of the X dimension perturbation, which is to say changing the direction of the phase center perturbation from +X to −X, or vice versa. From either block 1824 or 1826, the logic 1800 arrives at a block 1814. Block 1814 represents calculation or the setting of the new value of the X position ($X_{new}$) to its previous value plus an x-direction increment ($X_{old}+X_{inc}$) and the new Y position ($Y_{new}$) equal to the old Y position ($Y_{new}=Y_{old}$). If the value of the pulse number index n is determined to be odd, decision block 1810 routes the logic 1800 by its FALSE output to a decision block 1813. Decision block 1813 determines if $A_m P_n$ is less than $A_m P_{n-1}$. If $A_m P_n$ is less than $A_m P_{n-1}$, then a factor L is set equal to 1 in a block 1828, else L is set equal to −1 in a block 1830, changing the direction of the Y dimension perturbation from +Y to −Y or vice versa. Block 1816 represents calculation or the setting of the new value of the Y position ($Y_{new}$) to its previous value plus an Y-direction increment ($Y_{old}+Y_{inc}$) and the new X position ($X_{new}$) equal to the old X position ($X_{new}=X_{old}$). The logic 1800 of FIG. 6B flows from either block 1814 or block 1816 to a block 1820. Block 1820 represents the setting of $X_{OLD}$ to $X_{NEW}$ and $Y_{OLD}$ to $Y_{NEW}$. From block 1820, logic 1800 flows to a block 1822, which represents the creation of a matrix of ones and zeroes having the centroid in the desired location. The matrix may be represented in simple 10×10 form as $$\begin{bmatrix} 1 & 1 & 1 & 1 & 1 & 0 & 0 & 0 & 0 \\ 1 & 1 & 1 & 1 & 1 & 1 & 1 & 0 & 0 \\ 1 & 1 & 1 & 1 & 1 & 1 & 1 & 0 & 0 \\ 1 & 1 & 1 & 1 & 1 & 1 & 1 & 0 & 0 \\ 1 & 1 & 1 & 1 & 1 & 1 & 1 & 0 & 0 \\ 1 & 1 & 1 & 1 & 1 & 1 & 1 & 0 & 0 \\ 1 & 1 & 1 & 1 & 1 & 1 & 1 & 0 & 0 \\ 1 & 1 & 1 & 1 & 1 & 1 & 1 & 0 & 0 \\ 1 & 1 & 1 & 1 & 1 & 1 & 1 & 0 & 0 \\ 1 & 1 & 1 & 1 & 1 & 1 & 1 & 0 & 0 \end{bmatrix}$$

showing extra unused antenna elements in the uppermost row. These extra unused antenna elements skew the phase center downward and to the left from a centered position. Thus, the processing 1800 (FIG. 6B) of phase center correction block 418 of FIG. 4A examines the signal level in receive beams lacking targets to select as the appropriate phase center movement that movement which tends to minimize the noise content of those receive beams lacking targets.

Figure 7A:
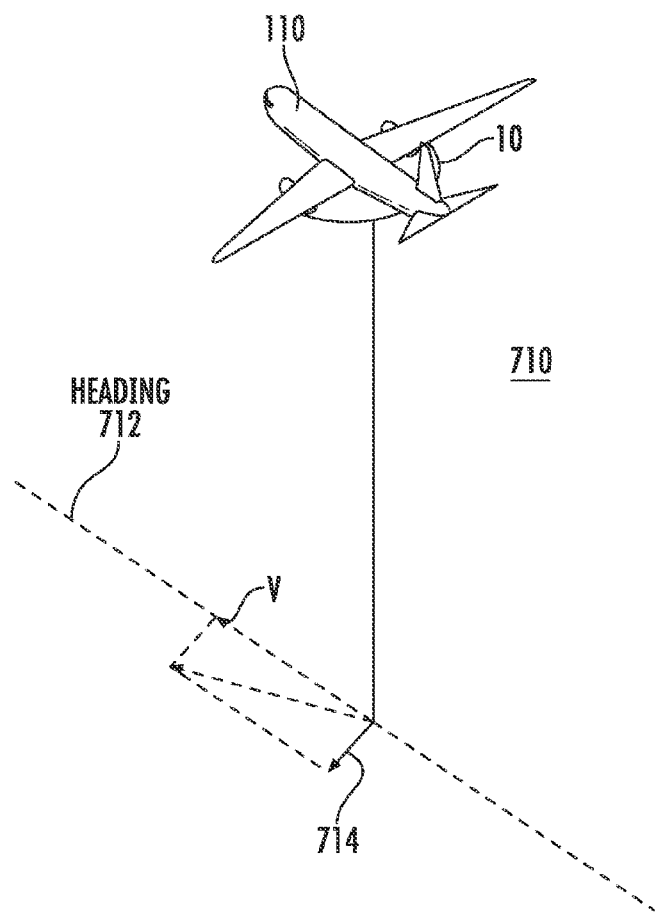
FIG. 7A is a simplified perspective or isometric view of an aircraft flying along a heading and subject to crosswind, to show deviation of the actual ground track from the desired ground track.
Figure 7B:
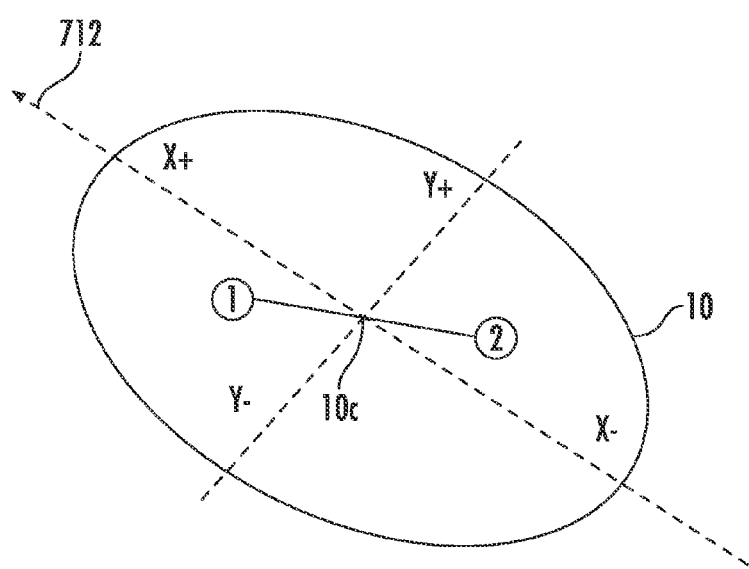
FIG. 7B shows the changes to the phase center which compensate for the crosswind drift.

FIG. 7A is a simplified illustration of a scenario 710 including aircraft 110 of FIG. 1A with its array 10, flying in a direction x+ with a ground velocity V along a heading illustrated as a path 712. The aircraft 110 is subject to a crosswind, with the crosswind component of ground speed illustrated by an arrow 714 of magnitude W. The magnitudes of V and W may be, for example, 100 meters per second (mps) and 10 mps, respectively. FIG. 7B illustrates the array 10 with Y+ and Y− axes orthogonal to the velocity vector or arrow 1712, with the center (0,0) of the array designated 10C. Also illustrated in FIG. 7 are circles designated 1 and 2, which represent the leading and lagging phase centers, respectively. The locations of the phase centers are related to the pulse repetition interval (PRI) and to the two velocities V and W. Assuming that the PRI is 0.01 seconds, the (x,y) location of the leading phase center is given by $$\left(\frac{V^*PRI}{2}, \frac{W^*PRI}{2}\right)$$

and the (x,y) location of the lagging phase center is given by $$\left(\frac{(-1)^*V^*PRI}{2}, \frac{(-1)^*W^*PRI}{2}\right)$$

Figure 8:
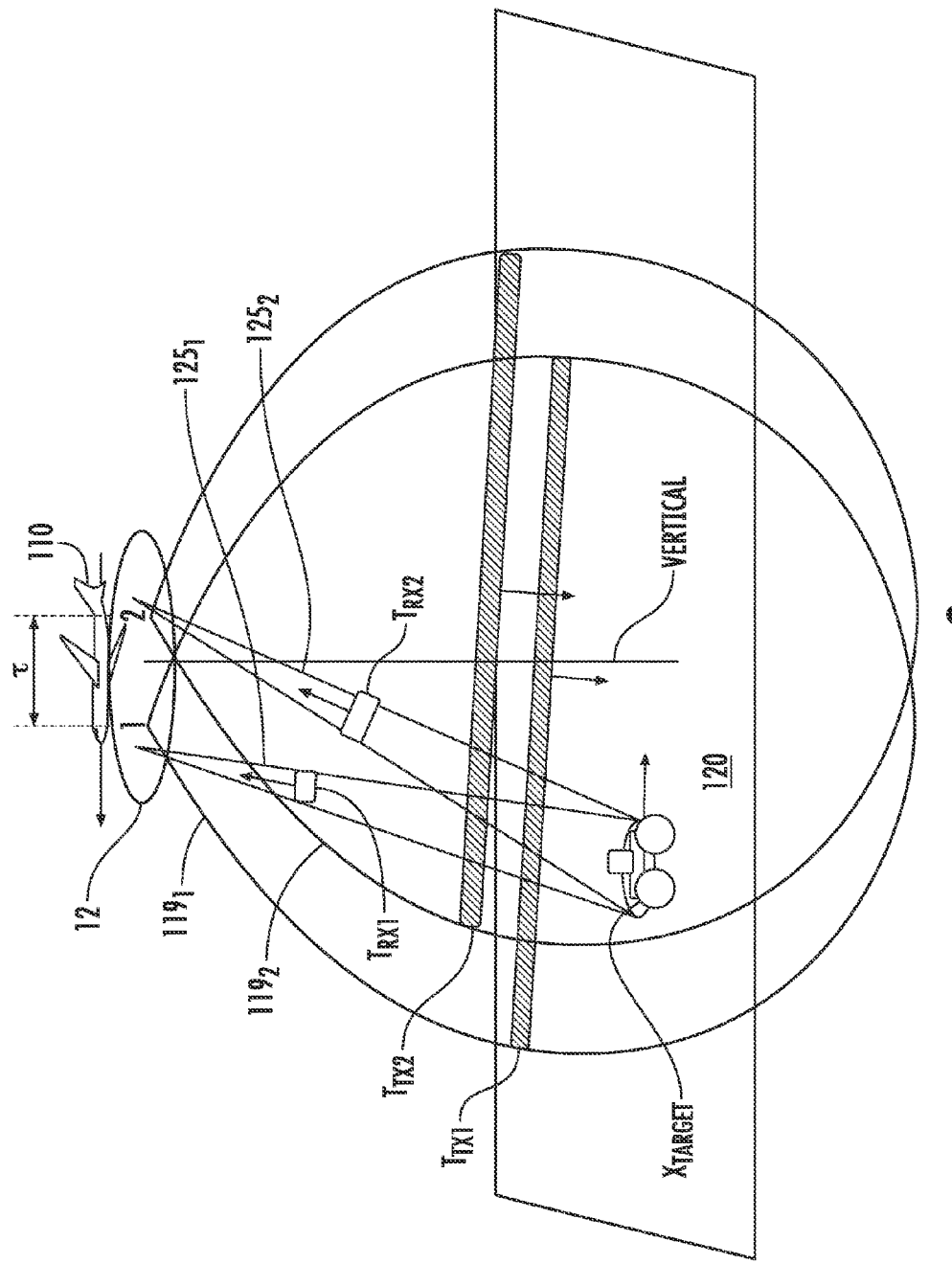
FIG. 8 is notional representation of the operation of a system according to aspects of the disclosure over space and time.

FIG. 8 is a simplified notional illustration showing aircraft 110 of FIG. 1A with its entire antenna array 12 generating transmit pulses. The transmit pulses are generated at times $T_{TX1}$ and $T_{TX2}$, and result in spoiled beams $119_1$ and $119_2$, respectively. Beams $119_1$ and $119_2$ each cover the entire coverage or target region 120, now somewhat elongated due to motion of the aircraft 110 in the interval between transmit pulses. A moving vehicle within the target region 120 is designated $X_{Target}$. The leading array is designated 1, and the lagging array is designated 2. Receive beams are generated by the leading and lagging arrays, which receive beams are illustrated as $125_1$ and $125_2$. Target information is reflected from terrestrial targets and returns to the leading and lagging arrays. The target information arising or resulting from the first transmit pulse (Tx1) is illustrated as hatched region Rx1, and returns to the antenna at a time designated $T_{Rx1}$. The target information arising or resulting from the second transmit pulse (Tx2) is illustrated as hatched region Rx2, and returns to the antenna at a time designated $T_{Rx2}$.

A method according to an aspect of the disclosure is for determining at least one of the presence and velocity of a moving surface target ($X_{target}$). The method comprises the step of mounting a planar array antenna (12) on an airborne vehicle (110) with a broad surface of the array (121s) perpendicular to the vertical (VERT). At first ($T_{Tx1}$) and second ($T_{TX2}$) times, pulses are transmitted of a radar beam (119) from the array (12) toward, or to cover a region (120) containing the targets ($X_{target}$) to thereby generate reflections from the targets. The reflections from the targets are received at the array antenna (12) to thereby generate first ($T_{Rx1}$) and second ($T_{RX2}$) received signals, respectively. The first received signals are processed to define a plurality of simultaneous first receive beams which together cover the region (120), thereby establishing the receive beams as being narrower than the transmit beam. The first receive beams originate from a first phase center (1) of the array (12), and the second received signals are processed to define a like plurality of simultaneous second receive beams which together cover the region (so narrower than the transmit beam), where the second receive beams originate from a second phase center of the array different from the first phase center, and where the first and second phase centers are spaced apart and electronically switched such that, during the time interval between the first and second pulses, the effective movement of the phase center equals the movement of the vehicle.

A method for determining the presence and velocity of a moving surface target ($X_{target}$) comprises the step of mounting a planar array antenna (12) on an airborne vehicle (110) with a broad surface (121s) of the array (12) perpendicular to the vertical (VERT). At first and second times (TTx1, TTx2), pulses of a (broad) transmit radar beam (119) are transmitted from the array (12) toward a region occupied by the targets ($X_{target}$) to thereby generate reflections from the targets. At times (TRx1, TRx2) following the first and second times (TTx1, TTx2), first and second reflections from the targets are received at the array antenna (12) to thereby generate first and second received signals, respectively. The first received signals are processed to define a plurality of simultaneous (narrow) receive beams (120R1, 120R2) which together cover the region of the targets (120) and which originate from a first phase center (1) of the array (12), and processing the second received signals to define a plurality of simultaneous (narrow) receive beams which together cover the region of the targets (120) and which originate from a second phase center (2) of the array (12), where the spacing of the first (1) and second (2) phase centers is selected such that, during the time interval between the first and second times (TTx1, TTx2), the effective movement of the phase center equals the movement of the vehicle, electronically enabling and disabling the processing of received signals from selected ones of the elements of the antenna array to thereby enable the first and second phase centers. The method includes the step of subtracting the first and second return signals to thereby cancel returns from stationary targets.

An airborne radar system according to an aspect of the disclosure comprises an airborne array antenna (12), and a transmitter arrangement (310) coupled to the array antenna (12) for generating transmit signals for driving the array antenna (12) for transmitting electromagnetic pulses in a beam (119), defining a beamwidth, downward from the array antenna (12). The radar system also includes first and second receiver arrangements (450) coupled to the array antenna (12), each of the receiver arrangements (410a, 410b) being for beamforming received reflected signals to define beams (120r1, 120r2), having beamwidths less than or smaller than the beamwidth of the transmit beam. The receive beams together cover the region (120) illuminated by the transmit beam (119), and are for responding to antenna-element enabling and disabling signals (BF multiplier signals from 412) for enabling some antenna elements and for disabling others. A moving-target enhancer (or equivalently stationary-target canceller) (414) includes first (414I1) and second (414I2) beam ports or beam port sets, the first beam ports (414I1) being coupled to the first receiver arrangement (410a), for enhancing moving target signals, which exhibit phase shift, applied to the first (414aI) and second (414bI) beam ports. A delay element (416) is coupled to the second receiver arrangement (410b) and to the second beam ports (414bI) of the moving-target enhancer (414), for delaying, by at least one electromagnetic pulse recurrence interval (PRI), the signals flowing from the second receiver arrangement (410b) to the second beam ports (414bI) of the moving target enhancer (414). A phase center controller (418) is coupled to the moving-target enhancer (414) for producing a pattern of the element enabling and disabling signals for identifying those elements of the array antenna which are to be enabled and disabled, to thereby establish effective motion of the phase center of the array antenna on reception. In a particular embodiment, a target detector (420) is coupled to the moving-target enhancer (414) for identifying and enhancing targets. In another embodiment, each of the first and second receiver arrangements comprises a source (424) of complex beam coefficients which define the parameters of the receive beams, beamformer multipliers (426) coupled to the source (424) of complex beam coefficients and to the phase center controller (418), for multiplying the complex beam coefficients by the element enabling and disabling signals to thereby produce antenna element control products or product signals. Complex multipliers (460) are coupled to the beamformer multipliers (426) for receiving the antenna element control products, and are also coupled to the array antenna (12), for multiplying the received reflected signals by the antenna element control products. The transmitter arrangement may further comprise a beam spoiler for applying a random function to each antenna element for generating the broad beam.

A receive arrangement according to an aspect of the disclosure comprises an array antenna (12) including a plurality of antenna elements at which received signals are received. A source (424) provides beam-defining complex beam coefficients. Another source (412, 418) provides beamformer multiplier signals; the state of each of the beamformer multiplier signals represents the processing or lack of processing (the processing gain) of the received signals of a corresponding one of the antenna elements, and these beamformer multiplier signals change state from time to time. Beam/phase-center multipliers (426) are coupled to the source (412, 418) of beamformer multiplier signals and to the source (424) of beam-defining complex beam coefficients, for generating beam and phase center control signals. Received signal multipliers (460) are coupled to the array antenna (12) and to the beam/phase-center multipliers (426), for multiplying the received signals by the beam and phase center control signals to thereby produce processed received signals. A beamformer arrangement (410a, 410b) includes input ports coupled to the received signal multipliers (460), and also includes beam-specific output ports, for generating target signals at the output ports. In a particular embodiment, the receive arrangement further comprises a transmitter (310) for transmitting electromagnetic pulses defining a pulse recurrence interval, a delay element (416) for delaying signals by one pulse recurrence interval, and a moving target enhancer (or equivalently a stationary target canceller 414) including input ports (414I1) coupled directly to the beamformer arrangement (410a, 410b) and other input ports (414I2) coupled to the beamformer arrangement (410a, 410b) by way of the delay element (416), for canceling non-moving targets. In a particular embodiment, the source (418, 1800) of beamformer multiplier signals examines the signal level in receive beams lacking targets to select as the appropriate phase center movement that movement which tends to minimize the signal content of those receive beams lacking targets.

An airborne moving target indicating radar, according to an aspect of the disclosure includes an array antenna (12) mounted on an airborne platform (110). The array antenna (12) includes antenna elements which receive radar return signals. A source (418) provides array element enable/disable signals which vary from time to time. A receive signal processor (450) is coupled to the elements of the array antenna (12), for multiplying the radar return signals by the array element enable/disable signals and by complex beam coefficients defining the receive beams, for thereby generating beam target signals. A beamforming arrangement (470) is coupled to the receive signal processor (450) for processing the beam target signals, and for generating separate beam signals, each including target signals relating to the particular beam, the beam signals being related to phase centers defined by the enable/disable signals, which as mentioned move from time to time.

What is claimed is:

1. A method for detecting the presence of a moving surface target, said method comprising the steps of:
   at first and second times, transmitting pulses of a radar beam from an array antenna of an airborne vehicle toward a region containing said targets;
   generating first and second received signals from reflections received at said array antenna;
   defining a plurality of simultaneous first receive beams from said first received signals, the first receive beams covering said region and originating from a first phase center of said array;
   defining a plurality of simultaneous second receive beams from said second received signals, the second receive beams covering said region and originating from a second phase center of said array different from said first phase center, said first and second phase centers being spaced apart and electronically switched such that, during the time interval between said first and second pulses, the effective movement of said phase center equals the movement of said vehicle.

2. A method according to claim 1, wherein said effective movement of said phase center is in a direction opposite to the movement of said vehicle.

3. A method for determining the presence and velocity of a moving surface target, said method comprising the steps of:
   at first and second times, transmitting pulses of a radar beam from a planar array antenna of an airborne vehicle toward a region including said targets to thereby generate reflections from said targets;
   generating first and second received signals from first and second reflections received from said targets at said array antenna at times following said first and second times; and
   defining a first plurality of simultaneous receive beams from said first received signals, the first plurality of receive beams covering the region including said targets and originating from a first phase center of said array;
   defining a second plurality of simultaneous receive beams from said second received signals, the second plurality of receive beams covering the region including said targets and originating from a second phase center of said array, said first and second phase centers having a spacing such that, during the time interval between said first and second times, the effective movement of said phase center equals the movement of said vehicle;
   electronically enabling and disabling processing of said received signals from selected ones of the elements of the antenna array to thereby enable said first and second phase centers; and
   subtracting said first and second received signals to thereby cancel received signals from stationary targets.

4. The method of claim 1, wherein said transmitting of a radar beam further comprises the steps of:
   selecting, from a plurality of preselected complex waveforms, a complex waveform to produce a spoiled radar beam that entirely covers said region containing targets.

5. The method of claim 4, further comprising replicating said selected complex waveform at a target pulse repetition rate on a plurality of output paths, each output path corresponding to one antenna element of said array antenna.

6. The method of claim 5, further comprising multiplying said complex waveform on each output path by a beamforming phase shift to produce an antenna element specific product.

7. The method of claim 6, further comprising multiplying each antenna element specific product by a spoiling phase shift to define a complex input phase to produce a beam of electromagnetic pulses which illuminates said region containing targets in its entirety.

8. The method of claim 1, wherein defining a plurality of simultaneous first receive beams further comprises the steps of applying signals received from each antenna element of said antenna array to a first leading beamformer.

9. The method of claim 8, wherein defining a plurality of simultaneous second receive beams further comprises the step of applying signals received from each antenna element of said antenna array to a second trailing beamformer.

10. The method of claim 9, further comprising applying a complex beam coefficient to each antenna array/receive beam combination to define a phase shift for each antenna element to produce a plurality of receive beams, wherein each receive beam is narrower than said transmitted radar beam.

11. The method of claim 9 further comprising the steps of:
applying a first receive beam output from said trailing beamformer to a moving target identification (MTI) function;
applying a second receive beam output from said leading beamformer to said MTI function, wherein said second receive beam output is delayed relative to said first receive beam output by one pulse repetition interval (PRI);
subtracting said first receive beam output from said second receive beam output to remove time invariant signals indicative of stationary objects.

12. The method of claim 11, wherein said first receive beam output and said second receive beam output are each generated by respective receive beams that cover a same beam footprint.

13. The method of claim 3, wherein said transmitting of a radar beam further comprises the steps of:
selecting, from a plurality of preselected complex waveforms a complex waveform to produce a broad radar beam that entirely covers said region including said targets.

14. The method of claim 13, further comprising replicating said selected complex waveform at a target pulse repetition rate on a plurality of output paths, each output path corresponding to one antenna element of said planar array antenna.

15. The method of claim 14 further comprising multiplying said complex waveform on each output path by a beamforming phase shift to produce an antenna element specific product.

16. The method of claim 15, further comprising multiplying each antenna element specific product by a spoiling phase shift to define a complex input phase to produce a beam of electromagnetic pulses which illuminates said region containing targets in its entirety.

17. The method of claim 3, wherein defining a plurality of simultaneous first receive beams further comprises the steps of applying signals received from each antenna element of said antenna array to a first leading beamformer.

18. The method of claim 17, wherein defining a plurality of simultaneous second receive beams further comprises the step of applying signals received from each antenna element of said antenna array to a second trailing beamformer.

19. The method of claim 18, further comprising applying a complex beam coefficient to each antenna array/receive beam combination to define a phase shift for each antenna element to produce a plurality of receive beams, wherein each receive beam is narrower than said transmitted radar beam.

20. The method of claim 19 further comprising the steps of:
applying a first receive beam output from said trailing beamformer to a moving target identification (MTI) function; and
applying a second receive beam output from said leading beamformer to said MTI function, wherein said second receive beam output is delayed relative to said first receive beam output by one pulse repetition interval (PRI), prior to subtracting said first and second received signals.

21. The method of claim 20, wherein said first receive beam output and said second receive beam output are each generated by respective receive beams that cover a same beam footprint.

* * * * *